United States Patent
Bang et al.

(10) Patent No.: US 11,640,066 B2
(45) Date of Patent: May 2, 2023

(54) FAILURE MITIGATION APPARATUS FOR WEARABLE DISPLAY DEVICES

(71) Applicant: ZEBRA TECHNOLOGIES CORPORATION, Lincolnshire, IL (US)

(72) Inventors: William R. Bang, Baiting Hollow, NY (US); Ronald Zancola, Phoenix, AZ (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 16/886,028

(22) Filed: May 28, 2020

(65) Prior Publication Data

US 2021/0373345 A1     Dec. 2, 2021

(51) Int. Cl.
*G02B 27/01* (2006.01)
*G06F 1/16* (2006.01)

(52) U.S. Cl.
CPC ......... *G02B 27/0176* (2013.01); *G06F 1/163* (2013.01); *G02B 2027/0138* (2013.01); *G02B 2027/0154* (2013.01); *G02B 2027/0163* (2013.01)

(58) Field of Classification Search
CPC ........ G02B 27/0176; G02B 2027/0138; G02B 2027/0154; G02B 2027/0163; G06F 1/163
See application file for complete search history.

(56) References Cited

U.S. PATENT DOCUMENTS

| | | | |
|---|---|---|---|
| 2006/0119539 A1 | 6/2006 | Kato et al. | |
| 2012/0147317 A1* | 6/2012 | Loeb, Jr. | G02C 5/124 351/55 |
| 2014/0043214 A1 | 2/2014 | Park et al. | |
| 2016/0216519 A1* | 7/2016 | Park | G06F 1/163 |
| 2018/0348524 A1 | 12/2018 | Blum et al. | |
| 2019/0339521 A1 | 11/2019 | Potakowskyj et al. | |

FOREIGN PATENT DOCUMENTS

WO     2019/104413 A1     6/2019

OTHER PUBLICATIONS

International Search Report and Written Opinion for International Application No. PCT/US2021/033686 dated Aug. 24, 2021.
Novelty Search Report for Belgian Patent Application No. BE 2021/5422 dated Feb. 25, 2022.

* cited by examiner

*Primary Examiner* — Mark Edwards
*Assistant Examiner* — Chayce R Bibbee

(57) ABSTRACT

A wearable computing device includes: a wearable housing; a display assembly supported by the housing and switchable between (i) an active configuration to occlude an optical path between an operator field of view and an exterior of the wearable computing device, and (ii) a fail-safe configuration to clear the optical path; and a mitigation subsystem including an actuator controllable to switch the display assembly from the active configuration to the fail-safe configuration in response to detection of a display failure condition.

18 Claims, 6 Drawing Sheets

FAILURE MITIGATION APPARATUS FOR WEARABLE DISPLAY DEVICES

BACKGROUND

Wearable display devices, such as virtual reality headsets, may present a wide variety of information to a user, e.g. on one or more display units integrated with the devices. The use of such devices may, however, impede awareness of the operator's surroundings.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1A:
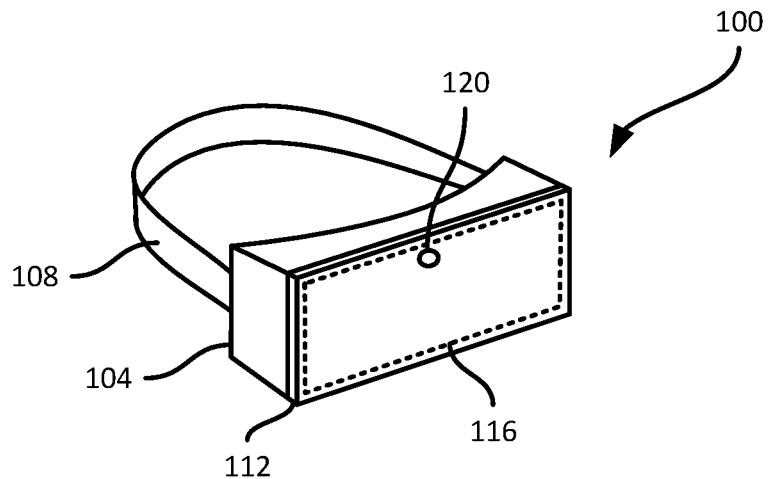
FIG. 1A is a diagram illustrating a wearable computing device.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a wearable computing device includes: a wearable housing; a display assembly supported by the housing and switchable between (i) an active configuration to occlude an optical path between an operator field of view and an exterior of the wearable computing device, and (ii) a fail-safe configuration to clear the optical path; and a mitigation subsystem including an actuator controllable to switch the display assembly from the active configuration to the fail-safe configuration in response to detection of a display failure condition.

Additional examples disclosed herein are directed to a method in a wearable computing device having a housing supporting a display assembly, comprising: operating the display assembly in an active configuration, wherein the display assembly occludes an optical path between an operator field of view and an exterior of the wearable computing device in the active configuration; monitoring an operational parameter of the wearable computing device; responsive to detecting a display failure condition based on the operational parameter, switching the display assembly to a fail-safe configuration, wherein the display assembly clears the optical path in the fail-safe configuration.

FIG. 1A shows a wearable display device 100, such as a virtual reality (VR) headset. The device 100 includes a housing 104 supporting various components of the device 100. The housing 104 is wearable, e.g. on the user's head via a headband 108 and/or other attachment mechanisms. In general, the device 100 is wearable to place at least a portion of the housing 104 before the eyes of an operator. The housing 104 supports a display assembly 112 that includes at least one display panel 116 (shown in dashed lines, as the display panel 116 is internal to the display assembly 112).

The device 100 can be deployed in a wide variety of environments. For example, the device 100 may be deployed for use by a warehouse worker such as a picker, forklift operator, or the like. In such deployments, the device 100 may present information such as pick lists or other tasks on the display panel 116. Because the display assembly 112 and the housing 104 obstruct an optical path between a field of view of the operator and the exterior of the device 100, the device 100 can also include a camera 120 to capture a video feed of the exterior of the device 100. In some examples, the device 100 can include a plurality of cameras 120. For example, the device 100 can include one camera 120 per display panel 116, and therefore may include two panels 116 (one for each eye of the operator) and two cameras 120.

The video feed can be presented on the display panel 116 along with data such as the above-mentioned task information, to enable visibility of the surroundings of the device 100 for the operator. In other words, although the display assembly 112 is opaque and occludes the operator's view of the surroundings of the device, the camera 120 and display assembly 112 can be employed by the device 100 to provide a digital transparency function enabling the exterior of the device 100 to remain visible to the operator.

Under certain conditions, however, referred to generally as failure conditions herein, the above-mentioned digital transparency function may fail, resulting in a loss of visibility to the operator of the device 100. For example, the camera 120 itself may fail, interrupting the above-mentioned video feed. In other examples, a battery powering the device 100 may become discharged, causing power loss to the device 100. In further examples, at least some of the information presented on the display 116 may be received over a network, and a connection between the device 100 and the network may fail or suffer reduced quality. In still other examples, a software failure at the device 100 such as a display driver crash may prevent continuous updating of the display panel 116 to provide the above digital transparency function.

To mitigate the effect of such failure conditions on the operator's awareness of their surroundings, the device 100 includes additional components enabling the display assembly 112 to switch between an active configuration and a fail-safe configuration. In general, in the active configuration the display assembly 112 occludes the operator's view of the exterior of the device 100 as described above. In the fail-safe configuration, however, the display assembly 112 clears the above-mentioned optical path, enabling the operator of the device 100 to see at least a portion of their surroundings without the aid of the digital transparency function mentioned above.

Figure 1B:
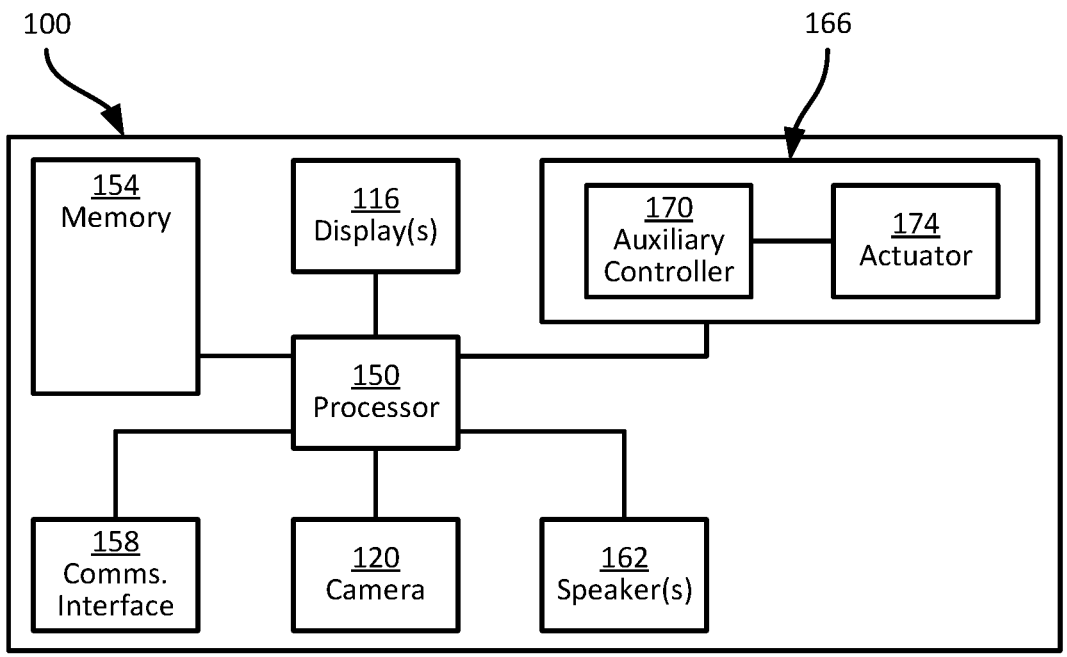
FIG. 1B is a block diagram of certain internal hardware components of the device of FIG. 1.

FIG. 1B illustrates certain internal components of the device 100. In particular, the device 100 includes a primary processor 150, such as a central processing unit (CPU), graphics processing unit (GPU) or a combination thereof. The processor 150 is interconnected with a non-transitory computer readable storage medium, such as a memory 154. The memory 154 includes a combination of volatile memory (e.g. Random Access Memory or RAM) and non-volatile memory (e.g. read only memory or ROM, Electrically Erasable Programmable Read Only Memory or EEPROM, flash memory). The processor 150 and the memory 154 each comprise one or more integrated circuits. The device 100 can also include a communications interface 158 enabling the device 100 to exchange data with other computing devices via a suitable network.

The device 100 also includes the display(s) 116 noted above, and can also include one or more speakers 162. The device 100 may include one or more microphones (not shown) in other examples.

In addition, the device 100 includes a mitigation subsystem 166 that is configured to switch the display assembly between the active configuration and the fail-safe configuration mentioned above, in response to detection of any of a set of failure conditions. The mitigation subsystem 166 can include a controller 170, which may also be referred to as an auxiliary controller 170. The subsystem 166 can also include an actuator 174 controllable by the controller 170 to switch the display assembly 112 from the active configuration to the fail-safe configuration. The controller 170 is configured to monitor various operational parameters of the device 100, and to operate the actuator 174 when such operational parameters meet certain preconfigured conditions indicating a device failure.

The controller 170 can be so configured via execution of computer-readable instructions stored in the memory 154 or within the controller 170 itself. In other examples, the controller 170 (and the functionality performed by the controller 170, as described herein) is implemented as one or more specially designed hardware and firmware components, such as a field-programmable gate array (FPGA), an application-specific integrated circuit (ASIC) and the like.

Various mechanism are contemplated for switching the display assembly 112 between the active and fail-safe configurations. In some examples, as discussed in connection with FIGS. 2 and 3, the display assembly 112 is movable between a first position corresponding to the active configuration, and a second position corresponding to the fail-safe configuration.

Figure 2:
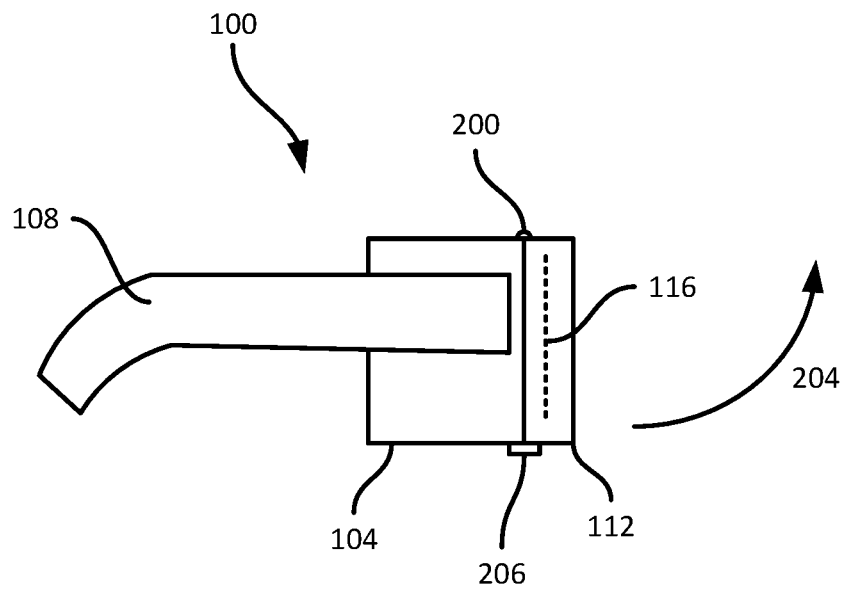
FIG. 2 is a diagram illustrating the device of FIG. 1 in an active configuration.
Figure 2:
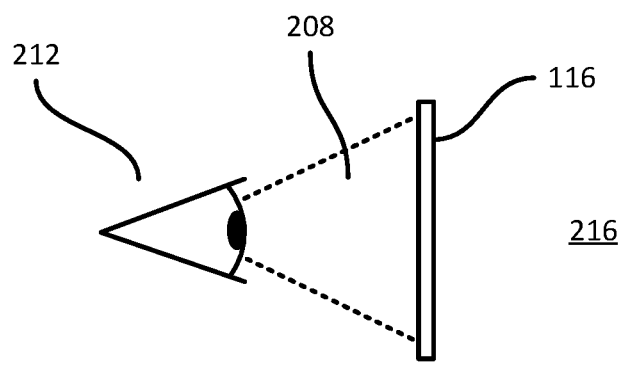

Turning to FIG. 2, an example implementation of the device 100 is shown from the side in the active configuration. As seen in FIG. 2, the display assembly 112 is coupled to the housing 104 via a hinge 200, e.g. at an upper edge of the display assembly 112. The display assembly 112 is therefore movable relative to the housing 104 in a direction 204 by rotating about the hinge. The hinge 200 can be biased (e.g. via a spring or other bias element) to move the display assembly 112 in the direction 204, and the display assembly 112 can be retained against the housing by a latching mechanism 206. The actuator 174 can be, for example, a solenoid or other actuator controllable to release the latch 206 upon detection of a failure condition. The actuator 174 (e.g. a solenoid) can be configured to retain the latch in the locked position when powered, and can have a fail-safe state that releases the latch 206 when power is lost.

As also seen in FIG. 2, when the display assembly 112 is in the active configuration, the display panel 116 obstructs a field of view 208 of the operator 212, such that the operator 212 sees the display 116 itself, rather than the exterior 216 of the device 100. The exterior 216 may be presented on the display 116 via the video feed captured by the camera 120, but no optical path is available between the field of view 208 and the exterior 216.

Figure 3:
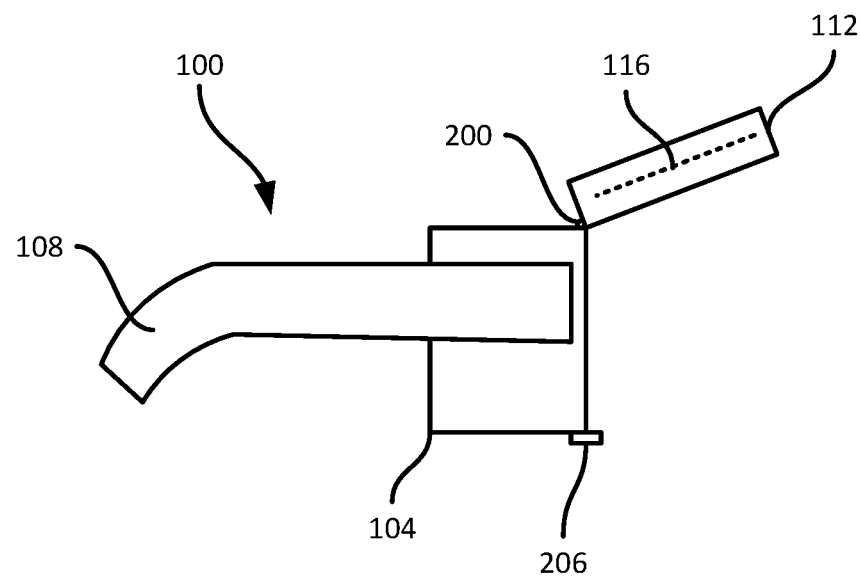
FIG. 3 is a diagram illustrating the device of FIG. 1 in a fail-safe configuration.
Figure 3:
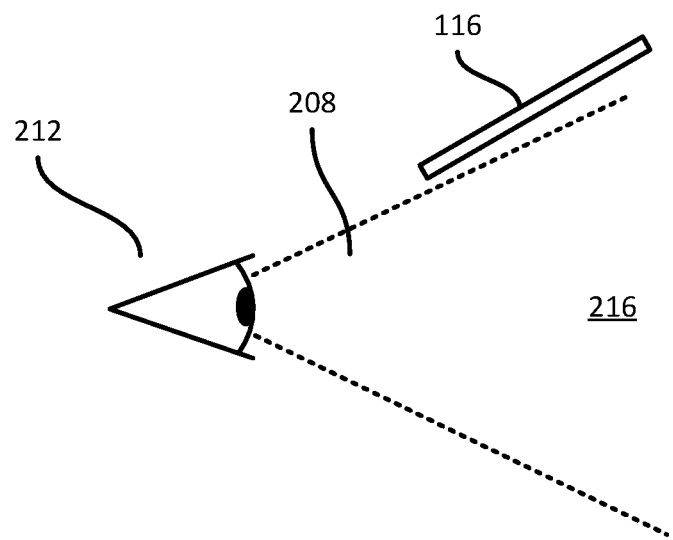

Turning to FIG. 3, the device 100 is shown following operation of the actuator 174 to release the latch 206 and enable the display assembly 112 to swing about the hinge 200 relative to the housing 104, e.g. under the action of the above-mentioned spring. In other examples, the hinge 200 may include a motor or other component of the mitigation subsystem 166 that rotates the display assembly 112 to the fail-safe configuration shown in FIG. 3.

As illustrated in FIG. 3, the field of view 208 of the operator 212 is no longer obstructed by the display panel 116 (or the remainder of the display assembly 112). Therefore, an optical path is provided between the field of view 208 and the exterior 216 of the device 100. In other words, when the display assembly 112 is in the fail-safe configuration, the operator 212 can see the exterior 216 of the device 100 without the digital transparency function mentioned earlier. The exterior 216 is therefore visible in the illustrated configuration even when the device 100 has lost power or otherwise malfunctioned.

In other examples, the hinge 200 can be provided at the lower edge of the display assembly 112 rather than the upper edge. The latch 206 can be provided at the upper edge in such examples. In still other examples, the display assembly can include two portions that each swing away from the housing 104 separately (e.g. on separate hinges). The portions of the display assembly 112 can swing out from the sides of the housing 104 in some examples, rather than upwards from the upper edge of the housing 104 as shown in FIG. 3 or downwards from the lower edge of the housing 104 as mentioned above.

Figure 4:
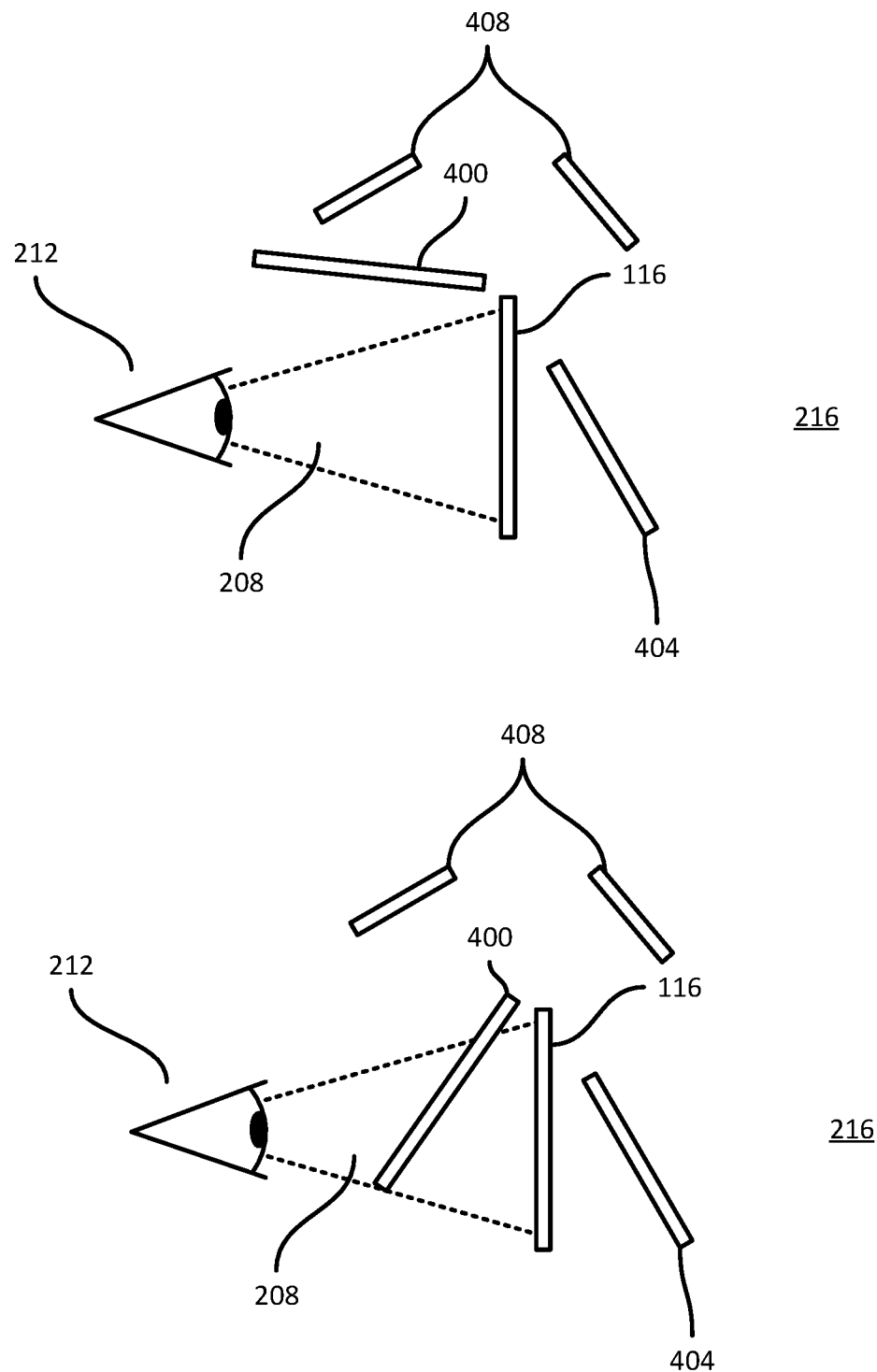
FIG. 4 is a diagram illustrating another example wearable computing device in active and fail-safe configurations.

In other examples, the display assembly 112 can be switched between the active and fail-safe configurations by other mechanisms than the hinge 200 and latch 206 shown in FIGS. 2 and 3. For example, the device 100 can include a set of optical elements such as mirrors, prisms, and/or lenses between an inlet such as a lens of the camera 120 and the operator 212. Turning to FIG. 4, an example implementation is shown (with the housing 104 omitted to show only certain internal components of the device 100) in which the device 100 includes a movable mirror 400, as well as mirrors 404 and 408.

In the active configuration, the mirror 400 is out of the field of view 208, and the mirrors 404 and 408 (with or without the assistance of the mirror 400) direct incoming light to an image sensor or the like. In the fail-safe configuration, however, the mirror 400 is rotated into the field of view 208 such that an optical path between the operator 212 and the exterior 216 is provided. The actuator 174, in such examples, can include one or more motors controllable by the controller 170 to set the position of the mirror 400.

Figure 5:
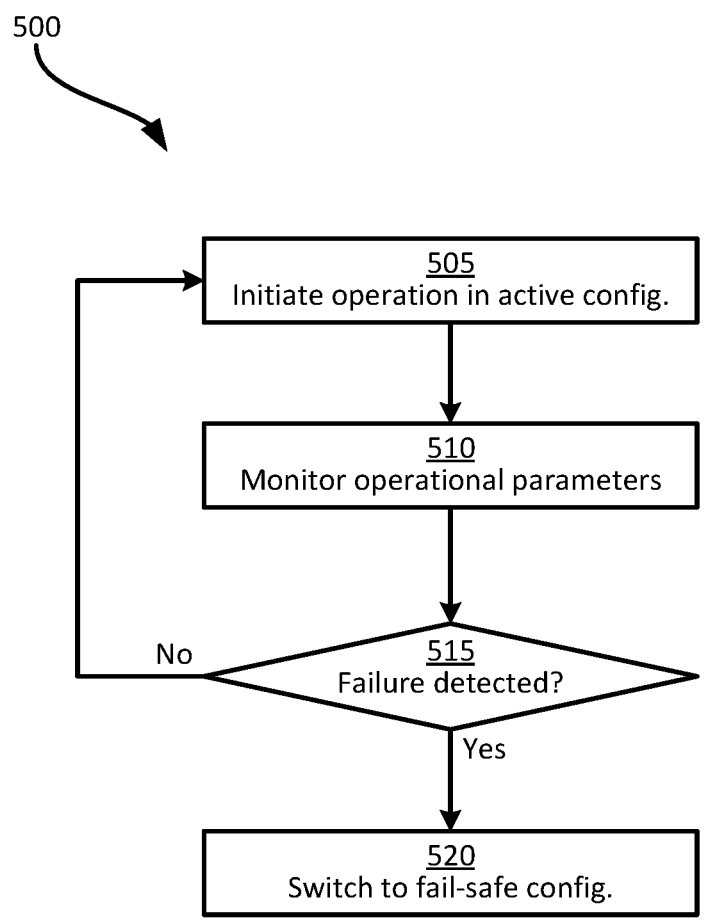
FIG. 5 is a flowchart of a method of mitigating display failure.

Turning now to FIG. 5, the functionality implemented by the device 100 will be discussed in greater detail. FIG. 5 illustrates a method 500 of mitigating display failure, which will be discussed below in conjunction with its performance by the computing device 100.

At block 505, operation of the device 100 is initiated with the display assembly 112 in the active configuration. Such operation can include rendering a video feed captured via the camera 120 on the display 116, and rendering additional information received over a network or stored in the memory 154.

At block 510, simultaneously with regular operation of the device 100 initiated at block 505, the controller 170 is configured to monitor any of, or a suitable combination of, various operational parameters of the device 100. The operational parameters monitored at block 510 are obtained from various other components of the device, including the processor 150, the communications interface 158, and the like.

Examples of operational parameters monitored at block 510 can include parameters associated with a power supply of the device 100 such as a battery. For example, a current charge level of the battery may be monitored at block 510, as well as power delivery parameters such as a voltage supplied to the processor 150 and the like. Such power state information can include parameters defining power supplied to individual components of the device 100, such as the display 116.

The operational parameters monitored at block 510 can also include an event stream from the processor 150, such as error events generated by an operating system executed by the processor 150 representing. In particular, such an event stream may be monitored for events indicating display-related failures such as display driver crashes, failures of communication between the processor 150 and the camera 120, or the like. The operational parameters may also include parameters derived from monitoring the video stream presented via the display 116. For example, a similarity measure between each successive pair of frames may be computed. The similarity measure exceeding a threshold may indicate that the video stream has frozen.

Further examples of operational parameters monitored at block 510 can include network connectivity attributes, such as a received signal strength indicator (RSSI) associated with a wireless link connecting the device 100 to a network, an indication of a proportion of dropped frames in sent or received communications, and the like.

The controller 170 may also monitor an orientation of the device 100 at block 510, for example via a motion sensor connected to the controller 170 either directly or via the processor 150. A further example of an operational parameter monitored at block 510 includes a heartbeat signal sent to the controller 170 by the processor 150. For example, the processor 150 can be configured to transmit a heartbeat signal to the controller 170 each time a frame is passed to the display 116 for rendering.

At block 515, the controller 170 is configured to determine, based on the operational parameters monitored at block 510, whether any of the operational parameters indicate a failure condition. The monitored parameters are evaluated against a set of predetermined conditions by the controller 170. For example, the determination at block 515 may be affirmative if the heartbeat signal mentioned above is not received for a predetermined time period (e.g. 0.1 seconds), indicating that no frames have been provided to the display 116 for that period.

Various other criteria for detecting failure conditions will now be apparent, according to the operational parameters monitored at block 510. For example, a failure condition may be detected if a current battery level of the device 100 falls below a threshold (e.g. 5%), or if power to the device 100 is lost. The controller 170 may be equipped with a backup power source such as a battery or supercapacitor, enabling the controller 170 to switch the display assembly 112 to the fail-safe configuration in the event of a power loss to the device 100. In other examples, as mentioned earlier in connection with the actuator 174, a backup power source may be omitted when the actuator 174 switches the display assembly 112 to the fail-safe configuration when not supplied with power.

A failure condition may also be detected at block 515 if the event stream from the processor 150 indicates a software crash associated with the display 116, such as termination of a display driver process that may prevent (at least temporarily) uninterrupted rendering of data at the display 116. In addition, a failure condition may be detected at block 515 if network connectivity is poor, e.g. if an RSSI falls below a threshold.

In connection with orientation data from a motion sensor, the determination at block 515 may be affirmative when the motion sensor data indicates that an angle of inclination (e.g. a roll angle) of the device 100 exceeds a threshold. Such an orientation may indicate that the operator of the device 100 has fallen.

When the determination at block 515 is negative, regular operation of the device 100 continues at block 505, and the controller 170 continues to monitor operation parameters of the device 100 at block 510. When the determination at block 515 is affirmative, however (i.e. when any of the above-mentioned conditions are satisfied by the monitored operational parameters), the controller 170 proceeds to block 520.

At block 520, the controller 170 is configured to control the actuator 174 to switch the display assembly 112 from the active configuration to the fail-safe configuration. For example, the controller 170 may release the latch 604 to allow the display assembly 112 to rotate about the hinge 200 toward the second position shown in FIG. 3, clearing the optical path between the operator's field of view 208 and the exterior 216 of the device 100.

Following a transition to the fail-safe configuration, the device 100 may be returned to the active configuration via various mechanisms. For example, rebooting the device 100 may return the device 100 to the active configuration. In other examples, such as the example shown in FIGS. 2 and 3, returning the display assembly 112 to the first position (e.g. manually, by the operator of the device 100), may return the device 100 to the active configuration.

Figure 6:
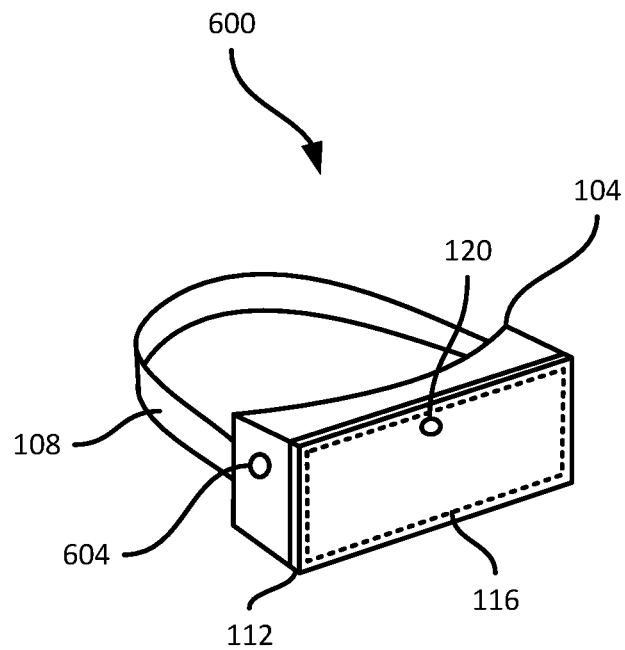
FIG. 6 is a diagram illustrating another wearable computing device.

Variations to the above are contemplated. For example, in some implementations the device 100 can include an input device, such as a button, microphone or the like, enabling the operator of the device 100 to trigger a switch from the active configuration to the fail-safe configuration. Referring to FIG. 6, an example device 600 is shown that includes the components of the device 100 discussed above, as well as an input 604 such as a button. The controller 170 can be configured, at block 510 of the method 500, to monitor the input 604. When the input 604 is activated, e.g. by the operator, the determination at block 515 is affirmative. When a microphone is employed as such an input device, the microphone can be monitored by the controller 170 at block 510, and when a predefined command is captured by the microphone (e.g. when spoken by the operator), the determination at block 515 is affirmative.

In other examples, the display 116 is a transparent display panel, and the display assembly 112 itself need not be transparent. Rather than providing a digital transparency function as mentioned earlier, the display assembly 112 can provide optical transparency to the operator, allowing light to enter the display assembly and traverse the display 116.

The display 116 may be transparent when inactive, but semi-opaque when active. Thus, display-related failures such as a video driver crash may still negatively affect visibility of the operator's environment. In addition, such display assemblies may include additional shutter panels (e.g. a black and white LCD panel without backlight) that operate as shutters to provide additional opacity to the display 116. Such panels may also be subject to failure conditions that impede the visibility of the operator's environment. In such implementations, at block 520 the auxiliary controller 170 can switch the display assembly 112 to a fail-safe configuration not by causing the physical movement of components such as a latch, but by interrupting power to the display 116 (and, if applicable, the shutter panel). In such examples, the actuator 174 may therefore be implemented as a power-interruption circuit rather than a solenoid or other mechanical actuator. Switching of such display panels to a transparent configuration may also be provided by sending specific control signals to the panels, rather than cutting power to the panels. Thus, more generally, the actuator 174 can include a control circuit (which may, but does not necessarily, include the above power-interruption circuit) connected to the display 116 and controllable by the auxiliary controller 170. The controller 170 can therefore apply control signals to the display 116 (and, where applicable, additional shutter panels) to render the display 116 transparent. The controller 170 may select between controlling the display 116 and cutting power to the display 116 based on the origin of a detected failure. For example, if the failure originates at the display 116 itself, power to the display 116 may be interrupted.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A wearable computing device, comprising:
a wearable housing;
a display assembly supported by the housing and switchable between (i) an active configuration to occlude an optical path between an operator field of view and an exterior of the wearable computing device, and (ii) a fail-safe configuration to clear the optical path;
a mitigation subsystem including
a controller configured to detect a display failure condition, and an actuator connected to the controller and controllable to switch the display assembly from the active configuration to the fail-safe configuration in response to detection of the display failure condition; and a primary processor, wherein the controller is configured to detect the display failure condition by monitoring a heartbeat signal from the primary processor.

2. The wearable computing device of claim 1, wherein the actuator includes a latch controllable to move between a closed position locking the display assembly in the first position, and an open position permitting the display assembly to move to the second position.

3. The wearable computing device of claim 1, wherein the display assembly includes an optical element movable between a first position corresponding to the active configuration, and a second position corresponding to the fail-safe configuration.

4. The wearable computing device of claim 3, wherein the actuator includes a motor to move the optical element between the first and second positions.

5. The wearable computing device of claim 1, wherein the controller is configured, to detect the display failure condition, to monitor at least one of:
   network connectivity attributes;
   power state information of the wearable computing device; and
   an orientation of the wearable computing device.

6. The wearable computing device of claim 1, further comprising at least one camera; wherein the display assembly is configured to render at least one video feed from the at least one camera in the active configuration.

7. The wearable computing device of claim 1, wherein the actuator includes a display panel control circuit, and wherein the mitigation subsystem is configured to switch the display assembly to the fail-safe configuration via the display panel control circuit.

8. The wearable computing device of claim 1, further comprising an input device; wherein the controller is configured to detect the failure condition by detecting an activation of the input device.

9. The wearable computing device of claim 8, wherein the input device includes at least one of a microphone and a button.

10. The wearable computing device of claim 1, wherein the display assembly is movable between a first position corresponding to the active configuration, and a second position corresponding to the fail-safe configuration.

11. The wearable computing device of claim 10, further comprising a hinge movably connecting the display assembly to the housing.

12. The wearable computing device of claim 11, wherein the hinge includes a bias element biasing the display assembly toward the second position.

13. A method in a wearable computing device having a housing supporting a display assembly, comprising:
   operating the display assembly in an active configuration, wherein the display assembly occludes an optical path between an operator field of view and an exterior of the wearable computing device in the active configuration;
   monitoring an operational parameter of the wearable computing device; and
   responsive to detecting a display failure condition based on the operational parameter, switching the display assembly to a fail-safe configuration,
   wherein the display assembly clears the optical path in the fail-safe configuration,
   wherein the monitoring includes monitoring a heartbeat signal from a primary processor of the wearable computing device.

14. The method of claim 13, wherein the display assembly includes an optical element movable between a first position corresponding to the active configuration, and a second position corresponding to the fail-safe configuration; and
   wherein switching the display assembly to the fail-safe configuration includes controlling a motor to move the optical element to the second position.

15. The method of claim 13, wherein the monitoring includes monitoring at least one of:
   network connectivity attributes;
   power state information of the wearable computing device; and
   an orientation of the wearable computing device.

16. The method of claim 13, wherein operating the display assembly in the active configuration includes rendering a video feed from a camera.

17. The method of claim 13, wherein the monitoring includes monitoring activation of an input device.

18. The method of claim 13, wherein the display assembly is movable between a first position corresponding to the active configuration, and a second position corresponding to the fail-safe configuration; and
   wherein switching the display assembly to the fail-safe configuration includes activating a latch to move the display assembly to the second position.

* * * * *